United States Patent

Engler et al.

(10) Patent No.: US 10,408,135 B2
(45) Date of Patent: Sep. 10, 2019

(54) METHOD FOR OPERATING A GAS TURBINE BELOW THE NOMINAL POWER THEREOF

(71) Applicant: Siemens Aktiengesellschaft, Munich (DE)

(72) Inventors: Thorsten Engler, Moers (DE); Markus Gorynski, Bochum (DE); Manuel Gutermuth, Essen (DE); Philipp Kreutzer, Haltern am See (DE); Marco Link, Mulheim (DE); Nicolas Savilius, Essen (DE); Kai Suselbeck, Oberhausen (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 459 days.

(21) Appl. No.: 14/768,095

(22) PCT Filed: Feb. 12, 2014

(86) PCT No.: PCT/EP2014/052710
§ 371 (c)(1),
(2) Date: Aug. 14, 2015

(87) PCT Pub. No.: WO2014/128039
PCT Pub. Date: Aug. 28, 2014

(65) Prior Publication Data
US 2015/0369137 A1    Dec. 24, 2015

(30) Foreign Application Priority Data

Feb. 22, 2013    (DE) .................. 10 2013 202 982

(51) Int. Cl.
*F02C 9/20*    (2006.01)
*F02C 9/22*    (2006.01)
(Continued)

(52) U.S. Cl.
CPC .................. *F02C 9/20* (2013.01); *F02C 3/04* (2013.01); *F02C 9/22* (2013.01); *F02C 9/28* (2013.01);
(Continued)

(58) Field of Classification Search
CPC .......... F02C 9/20; F02C 9/28; F05D 2270/05; F05D 2270/08; F05D 2270/083;
(Continued)

(56) References Cited

U.S. PATENT DOCUMENTS

| 7,269,953 B2 | 9/2007 | Gadde et al. |
| 2003/0005704 A1 | 1/2003 | Hock et al. |

(Continued)

FOREIGN PATENT DOCUMENTS

| CN | 1271404 A | 10/2000 |
| CN | 1321825 A | 11/2001 |

(Continued)

OTHER PUBLICATIONS

Russian Federation Notice of Allowance dated Dec. 11, 2017, for RU patent application No. 2015140079/06.

*Primary Examiner* — Craig Kim
*Assistant Examiner* — Katheryn A Malatek
(74) *Attorney, Agent, or Firm* — Beusse Wolter Sanks & Maire

(57) ABSTRACT

A method for operating a gas turbine below the nominal power includes: determining a lower power threshold value of the gas turbine which causes the gas turbine to leave a CO-emission-compliant partial load range of the gas turbine; providing a specified threshold value for output gas turbine power, wherein the specified threshold value is less than the nominal power of the gas turbine; and operating the gas turbine at an output gas turbine power above the specified threshold value at a constant exhaust gas temperature, (Continued)

wherein the inlet guide blades of a compressor of the gas turbine are closed further in order to reduce the output gas turbine power. A sufficiently large valve is selected for the specified threshold value so that increases of the primary zone temperature, combustion temperature, and exhaust temperature extend over a CO-emission-compliant partial load range of the gas turbine that is as large as possible.

13 Claims, 1 Drawing Sheet

(51) Int. Cl.
    *F02C 9/28*     (2006.01)
    *F02C 3/04*     (2006.01)

(52) U.S. Cl.
    CPC ...... *F05D 2220/32* (2013.01); *F05D 2270/05* (2013.01); *F05D 2270/08* (2013.01); *F05D 2270/083* (2013.01); *F05D 2270/303* (2013.01); *F23N 2041/20* (2013.01); *F23N 2900/05001* (2013.01)

(58) Field of Classification Search
    CPC .......... F05D 2270/303; F05B 2270/106; F05B 2270/1062–1064; F23N 2041/20; F23N 2900/05001

See application file for complete search history.

(56) References Cited

U.S. PATENT DOCUMENTS

| | | |
|---|---|---|
| 2004/0055272 A1 | 3/2004 | Tanaka |
| 2004/0060277 A1 | 4/2004 | Hatamiya et al. |
| 2006/0042258 A1* | 3/2006 | Gadde .................. F01D 17/162 60/772 |
| 2009/0053036 A1 | 2/2009 | Crawley et al. |
| 2011/0036066 A1 | 2/2011 | Zhang et al. |

FOREIGN PATENT DOCUMENTS

| | | | |
|---|---|---|---|
| CN | 101372914 A | 2/2009 | |
| CN | 101994572 A | 3/2011 | |
| CN | 102817714 A | 12/2012 | |
| DE | 102008044442 A1 | 2/2009 | |
| EP | 1967717 A1 | 9/2008 | |
| EP | 2397670 A1 | 12/2011 | |
| RU | 2392498 C2 | 6/2010 | |
| RU | 2418962 C2 | 5/2011 | |
| WO | 2011152840 A1 | 12/2011 | |
| WO | WO 2011152840 A1 * | 12/2011 | ................ F02C 9/52 |

\* cited by examiner

METHOD FOR OPERATING A GAS TURBINE BELOW THE NOMINAL POWER THEREOF

CROSS REFERENCE TO RELATED APPLICATIONS

This application is the US National Stage of International Application No. PCT/EP2014/052710 filed Feb. 12, 2014, and claims the benefit thereof. The International Application claims the benefit of German Application No. DE 102013202982.9 filed Feb. 22, 2013. All of the applications are incorporated by reference herein in their entirety.

FIELD OF INVENTION

The invention relates to a method for operating a gas turbine below its rated power, having the steps of: —determining a lower power limit value for the gas turbine as that power limit value beyond which further lowering of the output gas turbine power leads to departure from a partial load range of the gas turbine in accordance with CO emissions limits, —preparing a predefined limit value for an output gas turbine power, wherein the predefined limit value is smaller than the rated power of the gas turbine, —operating the gas turbine with an output gas turbine power above the predefined limit value with a constant averaged exhaust gas temperature, or a control variable (in the following termed the exhaust gas temperature) calculated therefrom, wherein in order to lower the output gas turbine power the inlet guide vanes of a compressor of the gas turbine are closed further.

BACKGROUND OF INVENTION

In the context of gas turbines used for generating electricity, it is known that these can be operated not only at, but also below, their rated load. This mode, termed partial load operation, can however lead to a substantial excess of air during combustion of the fuel; the combustion air ratio is then substantially greater than 1. In that context, the lower the power to be provided by the gas turbine, the greater the air excess can be. In this case, the combustion temperature of the fuel-air mixture in the combustion chamber drops, which has an analogous effect on the primary zone temperature which is relevant for CO emissions. If this temperature then undershoots a minimum value, increased CO emissions are generated. If the primary zone temperature is further reduced, the CO emissions can rise to such a point that they exceed an emissions limit value—which is generally set by law—so as to depart from the partial load range of the gas turbine in accordance with CO emissions limits. This can result in the operator of the gas turbine being forced—if such a legal CO emissions limit value exists—to switch off their gas turbine, that is to say that it is possible to further reduce the power of their gas turbine and to simultaneously bring CO emissions below the limit value.

In order to further increase the partial load capability, just described, of the gas turbine, the prior art document DE 10 2008 044 442 A1 proposes equipping such gas turbines with a bypass system through which part of the compressor end air is guided past the combustion chamber and can be fed into the exhaust gas duct of the gas turbine. It is thus possible to reduce the quantity of air supplied to the combustion, which raises the combustion temperature and thus the relevant primary zone temperature. The raise then leads to a reduction of CO emissions, such that, in spite of further-reduced load operation, the gas turbine can be operated in a manner which confirms to CO emissions limits. A disadvantage is, however, that the mode of operation known in the prior art unnecessarily reduces the efficiency of the gas turbine, since the bypassed compressed air does not contribute to the work conversion in the gas turbine.

SUMMARY OF INVENTION

The invention therefore has an object of providing a method for operating the gas turbine, which method has relatively high efficiency during operation in accordance with CO emissions limits even in partial load operation. The invention has a further object of providing a method which broadens the gas turbine operation in accordance with emissions limits at low loads.

This object relating to the method is achieved with the features of the independent claim. Advantageous refinements are indicated in the subclaims, whose technical teachings can be combined with one another as desired.

It is provided according to aspects of the invention that, in the case of decreasing load requirements, the output gas turbine power is lowered, wherein, if the output gas turbine power drops below the predefined limit value, the exhaust gas temperature of the gas turbine continues to be raised, as the gas turbine power continues to be lowered, up to a maximum exhaust gas temperature, wherein the predefined limit value is chosen such that the temperature rises of the exhaust gas temperature extend over as large as possible a partial load range of the gas turbine in accordance with CO emissions limits.

Frequently, a distinction is drawn between a measured exhaust gas temperature and what is termed a corrected exhaust gas temperature. The measured exhaust gas temperature is understood to be a temperature which actually arises in the exhaust gas. In detail, multiple exhaust gas temperatures are measured by sensors in a throughflow plane, whose values are then combined into a single temperature. In contrast, the corrected exhaust gas temperature is understood as a control variable which is derived from the measured exhaust gas temperature, taking into account the temperature of the sucked-in air and the rotational speed of the turbine. Within the context of the patent application, the averaged exhaust gas temperature can be understood either as the measured exhaust gas temperature, the corrected exhaust gas temperature or also an exhaust gas temperature determined in another manner.

An advantageous embodiment of the invention is that the exhaust gas temperature is raised in such a manner that the limit value for the CO emissions is reached only when the maximum admissible exhaust gas temperature is reached.

Advantageously, the predefined limit value is close to the rated load of the gas turbine. However, the predefined limit value is always less than 100% of the rated load; relative load indications are related to the rated load of the gas turbine. Particular advantage is given to the configuration in which the predefined limit value is greater than 70% of the rated load, in particular greater than 80% of the rated load and particularly greater than 90% of the rated load.

The above-described measure results in a comparatively moderate change in the exhaust gas temperature, in order to stress the gas turbine components affected by these temperature changes, and the downstream components, as little as possible.

With the invention, it is thus possible on one hand to further lower the lower limit of the operating range of the gas turbine in accordance with CO emissions limits within the displacement range of the inlet guide vanes, and thus to reach a lower percentage of the rated power at which the gas turbine can further be operated in the range in accordance with CO emissions limits. On the other hand, there results a stable regulating behavior of the gas turbine, since steeper temperature gradients are avoided. Moreover, the new operating method leads to an improved efficiency of the gas turbine in partial load operation. In addition, the conversion of the method according to the invention is possible without structural changes to the gas turbine, i.e. all that is necessary to convert the invention is to adapt the control apparatus, without noteworthy expenditure, to the method according to the invention. If, however, the components guiding the exhaust gas, such as the exhaust gas diffuser, the exhaust gas path and a possible downstream boiler are suitable for higher exhaust gas temperatures than hitherto, the advantages can arise to a greater extent.

Consequently, the temperature gradients during the occurring load change are particularly flat, such that the temperature-induced material expansions and thus the material stresses are kept comparatively low. This has the effect of extending the service life of the hot gas components of the gas turbine and on the components guiding the exhaust gas.

If the lower power limit value has been determined for operation in which the exhaust gas temperature is controlled at a constant value, independently of the output gas turbine power, it is provided that, as the output gas turbine power is lowered, the lower power limit value is reduced. The reduction of the lower power limit value is thus possible since raising the exhaust gas temperature reduces that power value of the gas turbine at which the emissions in the exhaust gas exceed the legal limit. Consequently, increasing exhaust gas temperature causes a downward extension of the operating window in accordance with CO emissions limits. In that respect, it is expedient to reduce the lower power limit value with increasing exhaust gas temperature.

According to a further advantageous configuration, the last exhaust gas temperature rise to the maximum exhaust gas temperature takes place as or just shortly before the lower or, as the case may be, reduced power limit value is reached. This ensures that the rise in the exhaust gas temperature is comparatively flat over the power reduction and extends over almost all of the partial load region, in accordance with CO emissions limits, of the gas turbine.

However, the measure described in the previous paragraph is not compulsory. Depending on the objective, it is also advantageous to choose a steeper rise in exhaust gas temperature and to reach the maximum admissible exhaust gas temperature long before the lower or, as the case may be, reduced power limit value is reached. This would allow a rise in efficiency, since the combustion temperature would be kept relatively high even in the case of only a minor reduction in power. The only thing to be monitored would then be that the gas turbine is not overfired.

Expediently, at the same time as raising the exhaust gas temperature, the quantity of combustion air supplied to the combustion chamber is reduced by further closing inlet guide vanes of a compressor of the gas turbine.

The above-described mode of operation is then in particular advantageous when the exhaust gas temperature of the gas turbine is regulated, and a setpoint value for the exhaust gas temperature continues to be raised, when the predefined limit value is undershot and as the gas turbine power is further lowered, until the maximum exhaust gas temperature is reached.

BRIEF DESCRIPTION OF THE DRAWINGS

Further advantages and features of the invention are explained in more detail with reference to an exemplary embodiment.

In the drawings.

DETAILED DESCRIPTION OF INVENTION

Figure 1:
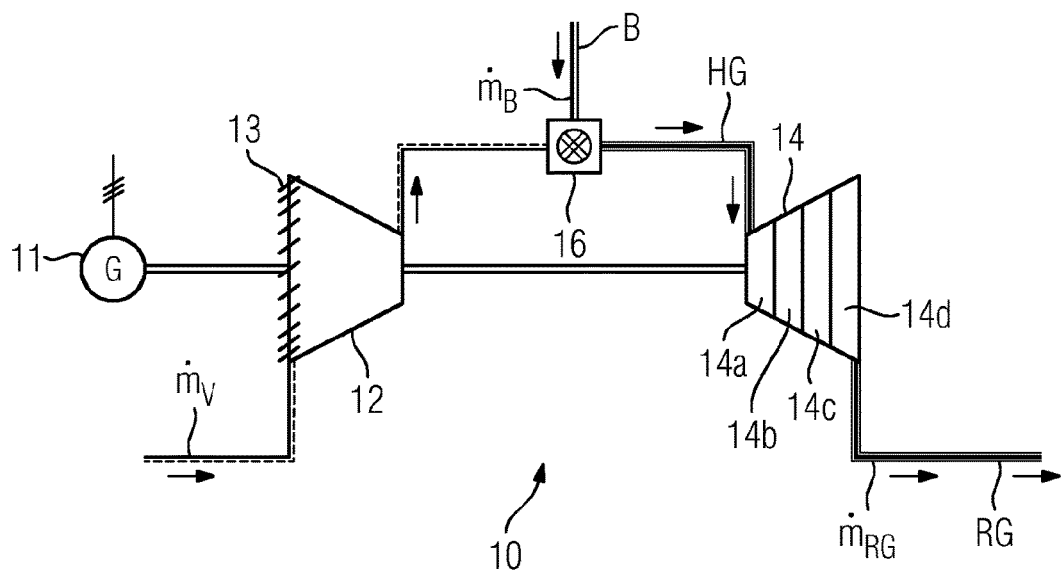
FIG. 1 shows the schematic structure of a gas turbine.

FIG. 1 shows, schematically, a static gas turbine 10 with a compressor 12 and a turbine unit 14 whose rotors are rigidly coupled to one another. A combustion chamber 16 is provided between the compressor outlet and the inlet section of the turbine unit 14. This can be configured as a silo combustion chamber, a tubular combustion chamber or as an annular combustion chamber. In the case of tubular combustion chambers, generally ten, twelve or even more tubular combustion chambers are provided. Also coupled to the compressor rotor is a generator 11 for generating current. At the air inlet of the compressor 12, there are provided compressor inlet guide vanes 13 which can be pivoted about their longitudinal axis and by means of which it is possible to set the compressor mass flow rate $m_v$. These guide vanes 13 are represented merely schematically. The turbine unit 14 comprises, according to the exemplary embodiment, four successive turbine stages 14a, 14b, 14c and 14d, which in the single figure are also represented merely schematically.

In operation, the compressor 12 sucks in ambient air, compresses it and supplies it to the combustion chamber 16. There, the compressed air is mixed with a fuel B and is combusted in a flame to give a hot gas HG. The hot gas HG flows into the inlet of the turbine unit 14 and expands, performing work, at the turbine blades (not shown in more detail) of the turbine unit 14. At the outlet of the turbine unit 14, the resulting exhaust gas RG flows away via an exhaust gas diffuser (not shown). Then, either the exhaust gas RG is discharged to the environment via a chimney, or the exhaust gas RG is used in what is termed a boiler, which is known as a waste heat steam generator, for generating steam. The steam generated in the waste heat steam generator then serves for driving steam turbines (not shown in more detail) or also as process steam. With the aid of the fuel mass flow rate $m_B$ and of the compressor mass flow rate $m_v$, it is possible to set the power to be delivered by the gas turbine 10.

Insofar as the gas turbine 10 is operated below its rated power, it is provided that, even in the case of high partial load, the exhaust gas temperature of the gas turbine is raised slightly, although such an exhaust gas temperature rise is not yet necessary to avoid CO emissions.

Figure 2:
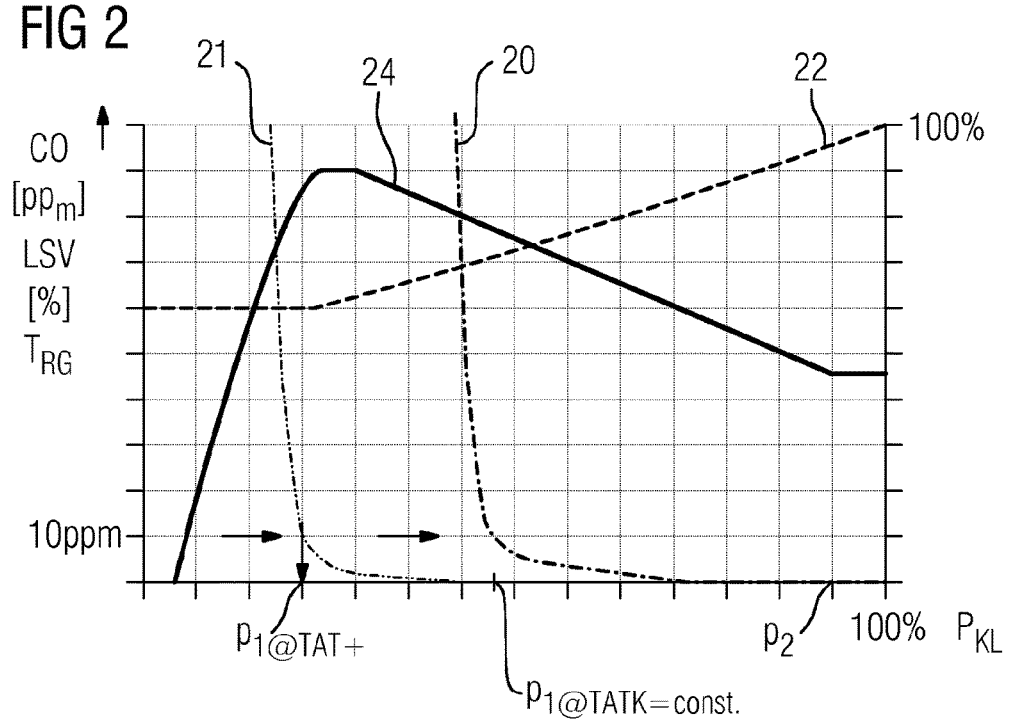
FIG. 2 is a diagram showing the position of the inlet guide vanes, the exhaust gas temperature and the CO emissions occurring in the exhaust gas over the generator terminal power.

This method is explained in detail with reference to the diagram shown in FIG. 2. The abscissa of the diagram shows the relative generator terminal power PKL, which represents the output gas turbine power. The maximum value of the relative gas turbine power is 100% (the rated power). Three parameters are plotted on the ordinate. The first parameter is the relative opening angle of the adjustable guide vanes, wherein a value of 100% represents the compressor inlet being fully open. As the percentage for the position of the inlet guide vanes decreases, the inlet of the compressor is further closed, causing the compressor mass flow rate $m_v$ to decrease. Second, the CO emissions contained in the exhaust gas are plotted on the ordinate with the unit [ppm], i.e. parts per million. The third parameter plotted in the diagram on the ordinate is the exhaust gas temperature.

The diagram shows one characteristic curve for each of the three parameters. The characteristic curve 22 shows the degree of opening of the adjustable inlet guide vane depending on the output gas turbine power. The characteristic curve 20 shows the CO emissions depending on the output gas turbine power for a constant exhaust gas temperature. The characteristic curve 21 shows the CO emissions depending on the output gas turbine power for an exhaust gas temperature raised in accordance with the invention. The characteristic curve 24 shows the temperature of the exhaust gas of the gas turbine depending on the output gas turbine power in accordance with the method according to the invention.

The characteristic curve 20 shows the dependence of the CO emissions in the exhaust gas of the gas turbine 10, as they occur during operation of a conventional gas turbine 10—that is to say without the method according to the invention. In the following explanation of the method according to the invention, a legal limit value of for example 10 ppm of carbon monoxide is assumed. With the aid of the legal limit value, and in conjunction with the characteristic curve 20, it is possible to determine a lower power limit value $p_{1@TATK=const.}$ as the lower limit of the partial load range, in accordance with CO emissions limits, of the gas turbine 10: the power range, in accordance with CO emissions limits, of the gas turbine 10 lies in the interval between $p_{1@TATK=const.}$ and below 100% of the rated power of the gas turbine 10, if the gas turbine 10 is operated in partial load as hitherto with constant exhaust gas temperature.

In addition, a predefined limit value $p_2$ is to be determined. this limit value could also be termed the upper power limit value and lies comparatively close to the rated load of the gas turbine 10, for example at a value of 95% of the rated power. It is however also possible to choose a somewhat lower figure for this value. All that is important is that $p_2$ lies closer to the rated power than to a lower, reduced power limit value $p_{1@TAT+}$. The lower, reduced power limit value $p_{1@TAT+}$ results from that operating point of the gas turbine 10 at which, despite raised primary zone temperature and raised exhaust gas temperature, there occur in the exhaust gas CO emissions which are above the legal limit value for CO emissions.

However, the lower power limit values $p_{1@TATK=const}$, $p_{1@TAT+}$ of the gas turbine 10 can also be determined in the case of emissions which deviate slightly from the legally prescribed CO emissions limit, in order to ensure that this CO emissions limit is always reliably observed.

The predefined limit value $p_2$ is used to determined that operating point of the gas turbine 10 at which, in the event of the predefined limit value $p_2$ being further undershot, the exhaust gas temperature is raised by closing the inlet guide vanes 13. By closing the inlet guide vanes 13 in the case of an only slightly reduced fuel mass flow rate $m_B$, it is possible to raise slightly the combustion temperature and thereby the primary zone temperature, which moreover allows the CO emissions to remain at a low level. As the gas turbine power is further lowered, the compressor inlet guide vanes close further, thus further lowering the compressor mass flow rate $m_v$. At the same time, the gas turbine 10 is operated in such a fashion that the combustion temperatures and thus also the exhaust gas temperatures rise further. This shifts the characteristic curve for the CO emissions from higher partial load values to lower partial load values. On account of the fact that the predefined limit value $p_2$ is significantly greater than the lower reduced power limit value $p_{1@TAT+}$ and the predefined limit value $p_2$ approximately corresponds to the rated load of the gas turbine, the rise in the exhaust gas temperature and also the rise in the primary zone temperature is rather flat in comparison with a mode of operation of the gas turbine in which the predefined limit value $p_2$ is comparatively close to the lower, reduced power limit value $p_{1@TAT+}$ of the gas turbine. It is thus possible to ensure operation of the gas turbine 10 which is comparatively protective of components.

Overall, the invention thus relates to a method for operating a gas turbine 10 below its rated power, having the steps of: —determining a lower power limit value $p_{1@TATK=const.}$ for the gas turbine 10 as that power limit value beyond which further lowering of the output gas turbine power leads to departure from a partial load range of the gas turbine 10 in accordance with CO emissions limits, —preparing a predefined limit value $p_2$ for an output gas turbine power, wherein the predefined limit value $p_2$ is smaller than the rated power of the gas turbine 10, —operating the gas turbine 10 with an output gas turbine power above the predefined limit value $p_2$ with a constant exhaust gas temperature, wherein in order to lower the output gas turbine power the inlet guide vanes 13 of a compressor 12 of the gas turbine 10 are closed further, In order, when preparing a particularly low partial load range of the gas turbine 10, to avoid relatively large temperature gradients and consequently to protect gas turbine components, it is provided that the predefined limit value $p_2$ is chosen such that the temperature rises of the primary zone temperature, of the combustion temperature and/or of the exhaust gas temperature extend over as large as possible a partial load range, in accordance with CO emissions limits, of the gas turbine 10.

The invention claimed is:

1. A method for operating a gas turbine during partial load, the gas turbine including a compressor with inlet guide vanes, the method comprising:
choosing a lower power limit value ($p_1$) for an output gas turbine power as a lower limit of a partial load range that corresponds with a carbon monoxide (CO) emissions limit when an exhaust gas temperature is controlled at a constant value,
choosing an upper power limit value ($p_2$) for the output gas turbine power between the lower power limit value ($p_1$) and a rated load of the gas turbine,
operating the gas turbine with the output gas turbine power above the upper power limit value ($p_2$) with the exhaust gas temperature controlled at the constant value, and
lowering the output gas turbine power by decreasing an opening angle of the inlet guide vanes,
wherein, when the output gas turbine power drops below the upper power limit value ($p_2$), raising the exhaust gas temperature of the gas turbine as the output gas turbine power is lowered, up to a maximum exhaust gas temperature, wherein the rise in exhaust gas temperature causes a downward shift in the lower limit of the partial load range resulting in a second lower power limit value ($p_{1@TAT+}$), thereby extending the partial load range, and
wherein the upper power limit value ($p_2$) is chosen to be closer to the rated load than the lower limit of the partial load range.

2. The method as claimed in claim 1,
wherein the upper power limit value ($p_2$) is greater than 70% of the rated load.

3. The method as claimed in claim 1,
wherein a last exhaust gas temperature rise up to the maximum exhaust gas temperature takes place before the second lower power limit value ($p_{1@TAT+}$) is reached.

4. The method as claimed in claim 1,
wherein, as the output gas turbine power is lowered, said exhaust gas temperature is raised stepwise or continuously.

5. The method as claimed in claim 4,
wherein, in order to raise said exhaust gas temperature, a quantity of combustion air supplied to a combustion chamber of the gas turbine is reduced by further decreasing the opening angle of the inlet guide vanes.

6. The method as claimed in claim 1,
wherein said exhaust gas temperature of the gas turbine is regulated, and a set point value for the exhaust gas temperature is raised, when the upper power limit value ($p_2$) is undershot and as the output gas turbine power is further lowered, until a maximum exhaust gas temperature is reached.

7. The method as claimed in claim 1,
wherein the upper power limit value ($p_2$) is greater than 80% of the rated load.

8. The method as claimed in claim 1,
wherein the upper power limit value ($p_2$) is greater than 90% of the rated load.

9. The method as claimed in claim 1,
wherein the upper power limit value ($p_2$) is greater than 95% of the rated load.

10. The method as claimed in claim 1,
wherein the upper power limit value ($p_2$) approximately corresponds to the rated load of the gas turbine.

11. The method as claimed in claim 1,
wherein the exhaust gas temperature is raised by closing the inlet guide vanes and lowering a compressor mass flow rate.

12. A method for operating a gas turbine during partial load, the gas turbine including a compressor with inlet guide vanes, the method comprising:
choosing a lower power limit value ($p_1$) for an output gas turbine power as a lower limit of a partial load range that corresponds with a carbon monoxide (CO) emissions limit when an exhaust gas temperature is controlled at a constant value,
choosing an upper power limit value ($p_2$) for the output gas turbine power between the lower power limit value ($p_1$) and a rated load of the gas turbine,
operating the gas turbine with the output gas turbine power above the upper power limit value ($p_2$) with the exhaust gas temperature controlled at the constant value, and
lowering the output gas turbine power by decreasing an opening angle of the inlet guide vanes,
wherein, when the output gas turbine power drops below the upper power limit value ($p_2$), raising the exhaust gas temperature of the gas turbine as the output gas turbine power is lowered, up to a maximum exhaust gas temperature, wherein the rise in exhaust gas temperature causes a downward shift in the lower limit of the partial load range resulting in a second lower power limit value ($p_{1@TAT+}$),
wherein the exhaust gas temperature rises continuously from when the output gas turbine power drops below the upper power limit value ($p_2$) up to the maximum exhaust gas temperature, then levels off so as to not exceed the maximum exhaust gas temperature before reaching the second lower power limit value ($p_{1@TAT+}$).

13. The method as claimed in claim 12,
wherein the exhaust gas temperature begins to fail after reaching the maximum exhaust gas temperature before reaching second lower power limit value ($p_{1@TAT+}$).

* * * * *